(12) United States Patent
Swillo et al.

(10) Patent No.: US 7,036,364 B2
(45) Date of Patent: May 2, 2006

(54) OPTICAL SYSTEM AND METHOD FOR MEASURING CONTINUOUSLY DISTRIBUTED STRAIN

(75) Inventors: Slawomir J. Swillo, Ann Arbor, MI (US); Kaushik Arjunan Iyer, Newark, DE (US); Shixin Jack Hu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 219 days.

(21) Appl. No.: 10/670,969

(22) Filed: Sep. 25, 2003

(65) Prior Publication Data
US 2005/0066721 A1 Mar. 31, 2005

(51) Int. Cl.
G01L 5/04 (2006.01)
G01L 1/24 (2006.01)
G01N 3/20 (2006.01)

(52) U.S. Cl. .............................. 73/159; 73/800; 73/849
(58) Field of Classification Search ................. 73/159, 73/800, 849, 788, 794
See application file for complete search history.

(56) References Cited
U.S. PATENT DOCUMENTS

| 4,186,610 | A | * | 2/1980 | Dolezal et al. | 73/805 |
| 4,591,996 | A | * | 5/1986 | Vachon | 702/42 |
| 4,969,106 | A | | 11/1990 | Vogel et al. | |
| 5,726,907 | A | | 3/1998 | Davidson et al. | |
| 5,920,383 | A | | 7/1999 | Chen et al. | |

OTHER PUBLICATIONS

Zhang, et al. A Study on Fundamental Mechanisms of Warp and Recoil in Hemming; Transaction of the ASME; vol. 123; Oct. 2001; pp. 436–441.
E.G. Thomsen; A New Approach to Metal–Forming Problems, Experimental Stress Analysis for a Tubular Extrusion; Trans. ASME, vol. 77, 1955; pp. 515–522.
R. Sowerby, E. Chu, and J.L. Duncan; Determination of Large Strains in Metalforming; J. Strain Analysis, 1982, vol. 17(2); pp. 95–101.
Y. Morimoto et al., Application of Moire Analysis of Strain Using Fourier Transform; Opt. Eng., vol. 27 (8), 1988, pp. 650–656.
H.S. Rice and R.M Knight; Technical Calculus and Analysis (McGraw–Hill Book Company, Inc. New York, 1959, p. 230).
Z. Marciniak, J.L. Duncan, and S.J. Hu; Mechanics of Sheet Metal Forming; $2^{nd}$ Edition, Butterworth–Heinemann, 2002, p. 3.
S. Wolfram; Mathematica Handbook; $4^{th}$ Edition, Mathematica vol. 4.2 WolframResearch Inc., Chap. 3.8.1.

* cited by examiner

*Primary Examiner*—Edward Lefkowitz
*Assistant Examiner*—Lilybett Martir
(74) *Attorney, Agent, or Firm*—Harness, Dickey & Pierce, P.L.C.

(57) ABSTRACT

A optical system and method of measuring a strain on a surface of a band of a sheet of a material. A single line, or an area having a boundary line, is marked on the band before deformation. The line traverses a width of the band at angle. The band is deformed and an equivalent two-dimensional image of the line after deformation is obtained. The line before deformation is compared with the two-dimensional equivalent image of the line after deformation, and the strain on the surface of the band after deformation is determined.

14 Claims, 10 Drawing Sheets

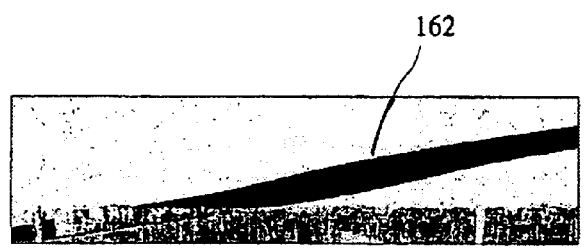
FIG. 5b
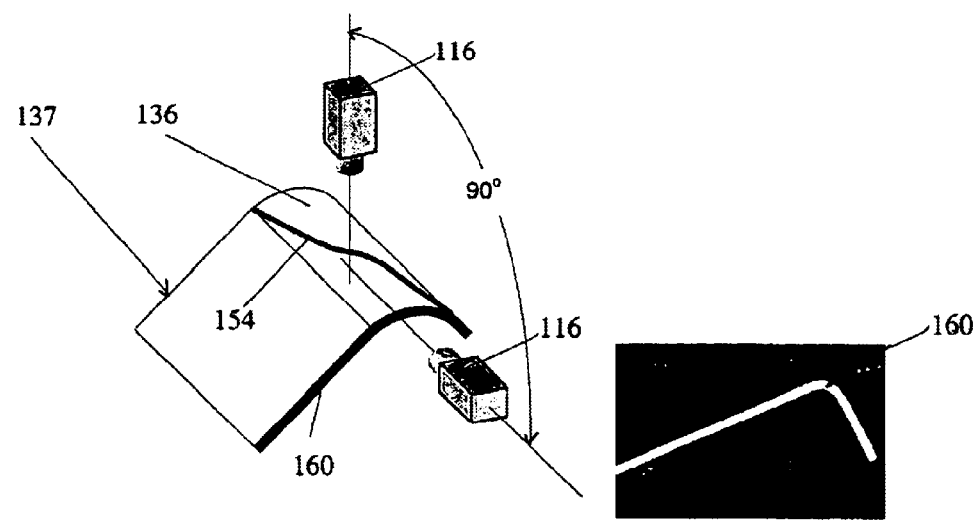
FIG. 5c
FIG. 5a

OPTICAL SYSTEM AND METHOD FOR MEASURING CONTINUOUSLY DISTRIBUTED STRAIN

FIELD OF THE INVENTION

The present invention relates to optical methods of determining surface strain in sheets after deformation.

BACKGROUND OF THE INVENTION

Forming operations for many applications include bending a sheet of material through a large bend angle, such as 20° to 180°, to produce a permanently deformed or bent band. An example of this process is "hemming", in which the edge of a sheet is folded over itself by bending it through an angle of 180°. Hemming is used, for example, in automobile assembly, to join inner and outer closure panels, such as in car doors or deck lids, for functional, safety or aesthetic considerations.

To evaluate the mechanical strength of the sheet after bending, and control the introduction of defects during the forming process, it is important to obtain and consider the strain distribution in the deformed region. In hemming, for example, undesirable recoil and surface warp may be introduced by large strains.

Strain measurement in the region of a large bend angle is the focus of ongoing research and development because of the difficulties involved in measuring highly localized and nonlinear deformations. In the case of hemming, for example, the sheet thickness is t~1 mm and the outer surface of the bent region has a nominal radius of only 2t ~2 mm. The dimension of the region within which the maximum strain is concentrated is much smaller, of the order of tens of microns. Consequently, the strain measurement method must have a correspondingly high resolution.

Because of localized large plastic strains, the strain measurement of large-angle bending is difficult or complicated using existing methods. Currently, two experimental techniques are commonly used for measuring strain distribution on the deformed region of sheet components: the grid method, and the moiré method with Fourier transforms. A description of the grid method can be found in an article entitled "New Approach to Metal Forming Problems", by E. G. Thomsen (Trans. ASME, vol. 77, 1955, 515–522), and another article entitled "Determination of the large strains in metal forming", by R. Sowerby, E. Chu, and J. L. Duncan (J. Strain analysis, 1982, vol. 17(2), 95–101). The moiré method is described in "Application of Moiré Analysis of Strain Using Fourier transform", by Y. Morimoto, et al. (Opt. Eng., Vol. 27 (8), 1988, 650–656). Both the grid and moiré techniques require analysis of digitized images of surfaces of the deformation region to obtain measurements of the geometry of the deformation process, but they differ significantly in the analytical procedure used to derive strain from displacement.

Generally stated, grid methods divide the area of interest into line or area units and provide values of strain that are averages over each unit. The smaller the grid size, the greater the resolution and accuracy. The strain measured with a grid method is attributed to the geometric center of each area unit and therefore the measurement process is discrete in nature. The main disadvantage of the grid methods when applied to large deformation sheet deformation is that critical strain concentrations caused by steep gradients cannot be captured accurately because of the averaging inherent to the grid discretization. Examples of patterns that can be used with the grid method are shown in FIGS. 11a, 11b and 11c.

In the moiré method, a pattern consisting of identical unidirectional lines, oriented parallel to the bent line, or a grid consisting of identical squares can be used to measure sheet bending displacements. A moiré pattern is typically generated by the superposition of two gratings: a model grating and master grating (geometric moiré). Since the displacement information is obtained from the master grating pitch for the points of maximum and minimum light intensity of moiré fringes, the smallest strain that can be measured depends in part on the density of the pattern. The accuracy of the measured strain is also dependent on the number of data points analyzed from the captured image of the deformed grating. In principle, Fourier analysis for strain determination considers all points within the deformed grating. The resolution obtained in practice is, however, limited to the number of pixels in a coupled charged device (CCD) camera that is used to take the images and in the operational magnification. An example of a pattern that can be used with the moiré method is shown in FIG. 11b.

New methods of strain measurement for large angle bending that do not require a grid or a pattern to be imprinted on the surface of strain measurement are, therefore, desirable.

SUMMARY OF THE INVENTION

The invention provides an optical system and method of measuring a strain on a surface of a band of a sheet of a material. In one embodiment, a single line, which may be the boundary of a line having a certain width, or an area having a boundary line, is marked on the band before deformation. The line traverses a width of the band at an angle. The band is deformed and an equivalent two-dimensional image of the line after deformation is obtained. The line before deformation is compared with the two-dimensional equivalent image of the line after deformation, and the strain on the surface of the band after deformation is determined.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3a is a top view of the sheet of FIG. 2a;

FIG. 5a is a perspective view of camera positioning in relation to the sheet after deformation according to an embodiment of the invention;

FIG. 5b is a plan view image of the sheet shown in FIG. 5a;

FIG. 5c is a profile view image of the sheet shown in FIG. 5a;

FIG. 9b is the displacement associated with the deformation of FIG. 9a;

DETAILED DESCRIPTION OF THE PREFERRED EMBODIMENTS

The following description of the preferred embodiment(s) is merely exemplary in nature and is in no way intended to limit the invention, its application, or uses.

Figure 1:
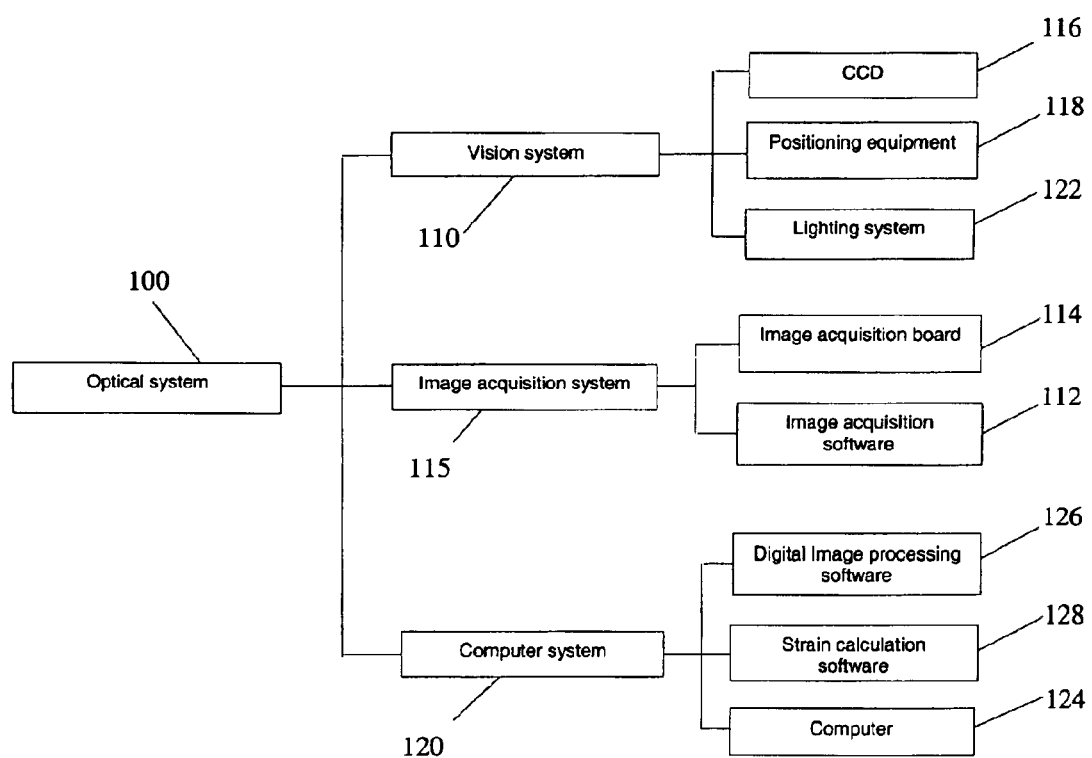
FIG. 1 is a schematic diagram of an embodiment of an optical system for measuring strain according to the invention.

FIG. 1 is a diagram of an embodiment of an optical system 100 for measuring surface strain according to the invention. The optical system 100 includes a vision system 110, an image acquisition system 115 communicating with the vision system, and a computer system 120 communicating with the image acquisition system 115. The vision system 110 includes one or more coupled charge device (CCD) cameras 116 that are mounted on a positioning system 118 such that they can be rotated and/or moved along three axes. A lighting system 122 may also be provided. The camera 116, the positioning system 118 and the lighting system 122 are standard, commercially available components.

The image acquisition system 115 includes an image acquisition board 114 and an image acquisition software 112. The image acquisition software 112 operates the image acquisition board 114 to automatically capture and save the images from each camera 116. The image acquisition system 115 communicates with a computer system 120 that includes a commercially available computer 124, digital image processing software 126 and strain calculation software 128.

Figure 2A:
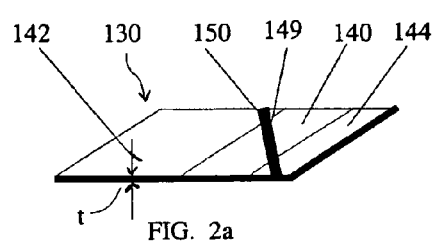
FIG. 2a is a perspective top view of a marked sheet before deformation according to an embodiment of the invention.
Figure 2B:
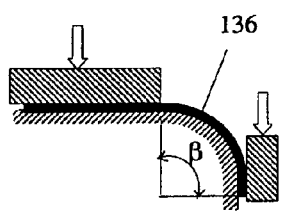
FIG. 2b is a side view of the sheet of FIG. 2a after deformation.
Figure 3A:
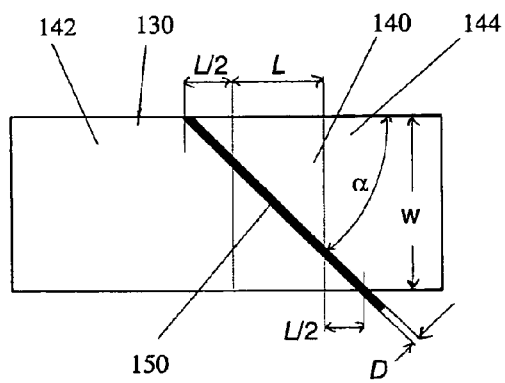
Figure 3B:
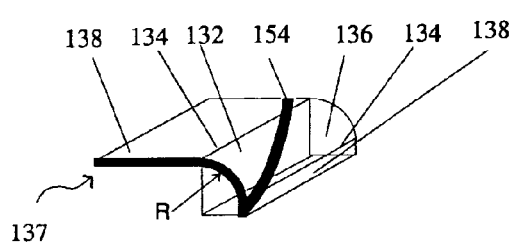
FIG. 3b is a perspective side view of the sheet of FIG. 2b.

Referring to FIGS. 2–4, the optical system 100 operates to measure large bend angle strain for an initially flat, undeformed sheet 130 which undergoes metal forming, hemming or other bending operation that results in a large bend angle β, so that it becomes a plastically deformed sheet 137. The bend angle β is defined as the angle formed by the planes 132 that are orthogonal to the deformed sheet 137 at the boundaries 134 between the deformed bent band 136 and the undeformed regions 138 of the deformed sheet 137.

In the undeformed sheet 130, the region of anticipated deformation is identified as an undeformed band 140, which separates the undeformed sheet 130 into two outer regions 142, 144 that lie outside the undeformed band 140. Instead of a grid or other pattern, a single marking 149 is applied on the undeformed sheet 130 traversing a width of the band 140 at an angle α, as shown in FIG. 3a. The marking 149 may be a line 150, a band or even an area, as long as the marking has a boundary that provides a straight edge (such as the line 150) between the marked and unmarked regions of the undeformed sheet 130. For concreteness, the following discussion refers to the line 150, but it will be understood that the invention is not so limited.

The line 150 is drawn to traverse the undeformed band 140 and extend into the outer regions 142, 144, in which no deformation is anticipated. For an undeformed band 140 with anticipated width equal to "L", the angled line 140 preferably extends a distance L/2 on either side of the band 140 in the longitudinal direction of the undeformed sheet 130. Therefore, for a sheet of given width "w", the angle α is equal to $\tan^{-1}(w/2L)$.

The line 150 can be drawn with any marking instrument, such as a felt tip marker, crayon, ink, etc., that can leave a demarcating trace on the surface of the undeformed sheet 130, which is discernible on the deformed sheet 137 in images obtained by the vision system 110 and processed in the computer system 120. The line 150 can be of any color or thickness as long as there is sufficient contrast between the line and the background area of the sheet. In a preferred embodiment the line 150 has a width "D" in the range of 3–10 pixels.

Figures 4A, 4B:
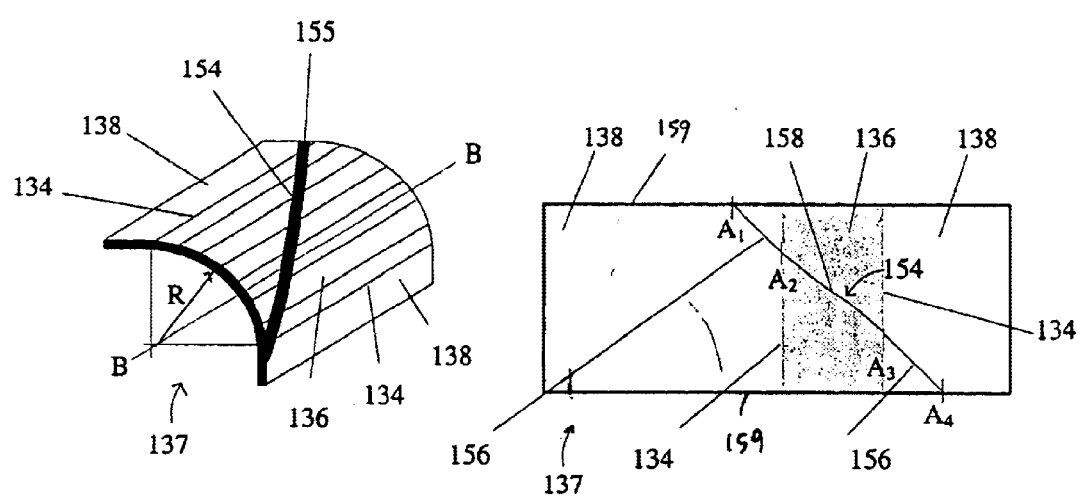
FIG. 4a is a magnified partial view of FIG. 3b.
FIG. 4b is the top view of FIG. 3b, shown after edge detection.

Referring to FIGS. 4a and 4b, the undeformed line 150 becomes a deformed line 154, which is the boundary of the deformed marking 155. The strain in the deformed bent band 136 increases as the local bend radius "R", which is the radius of curvature, decreases from infinity at the boundaries 134 to a local maximum value therebetween. The strain along lines parallel to a bend axis "B" is substantially constant. Therefore, the strain along the boundaries 134 of the bent band 136 is zero. If the deformed sheet 137 shown in FIG. 4a is unrolled to a flat shape as shown in FIG. 4b, the unrolled deformed line 154 has two straight portions 156 and an S-shaped portion 158 therebetween. The straight portions 156 extend between the boundaries 159 of the deformed sheet 137 and the boundary lines 134 of the deformed band 136. The straight portions 156 extend from $A_1$ to $A_2$ and from $A_3$ to $A_4$, where $A_1$ and $A_4$ are on the boundaries 159 of the deformed sheet 137 and $A_2$ and $A_3$ are on the boundary lines 134 of the deformed bent band 136.

The strain distribution in the deformed bent band 136 can be obtained through a direct comparison of the undeformed angled line 150 with the deformed angled line 154. Because the deformed angled line 154 is a three-dimensional curve that lies on surface of the bent band 136, it cannot be directly compared with the undeformed line 150 which lies in the two-dimensional (flat) sheet 130. Therefore, a plan view image of the undeformed angled line 150 cannot be directly compared with a plan view of the deformed line 154 to obtain the correct strain. The three-dimensional deformed line 154 is first converted to an equivalent two-dimensional deformed line by taking into account the curvature of the bent band 136, utilizing a profile image and a plan view image the deformed line 154, as shown in FIGS. 5a, 5b, and 5c. The plan and profile views may be taken using two cameras 116 oriented at 90° to each other, or using a single camera 116, which is rotated 90° from the plan view position to the profile view position.

Referring to FIGS. 5a–5c, the profile view of the deformed line 154 outlines a profile line 160, which is also a profile line of the deformed sheet 137. The plan view image 162 and the profile image 160 of the deformed line 154 are processed and digitized in the image acquisition system 115 using commercially available image acquisition software 112 that can be purchased with the image acquisition board 114. The thresholding operation of edge detection is performed by the image processing software 126 to obtain one-pixel width edges for the plan view image 162 and the profile view image 160 of the deformed angled line 154.

Figure 6:
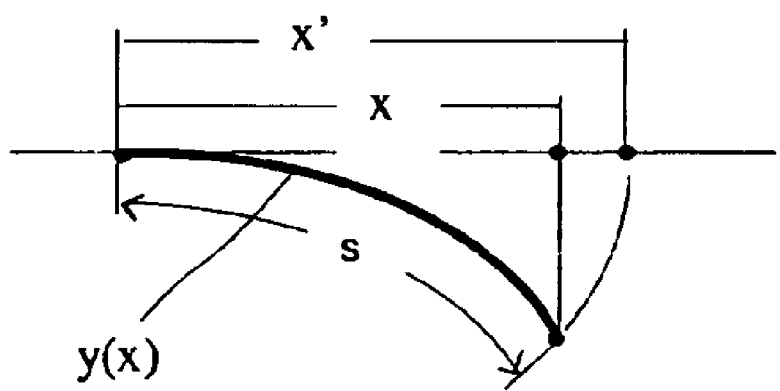
FIG. 6 is a diagram illustrating a coordinate transformation according to an embodiment of the invention.

The deformed angled line 154 is transformed from three dimensions to two dimensions by expressing an equation or a graph describing the plan view image 162 of the deformed line 154 in terms of a coordinate x', which represents the effect of unrolling the deformed sheet 137 by using the following transformation:

$$x' = s = \int_0^x \sqrt{1 + \left(\frac{dy}{dx}\right)^2} \, dx$$

where the function y(x) describes the profile line 160. This transformation is illustrated in FIG. 6. This transformation is known in the art and is described, for example, in "Technical calculus and analysis", by H. S. Rice, and R. M. Knight (McGraw-Hill Book Company, Inc. New York, 1959, p. 230).

Figure 7:
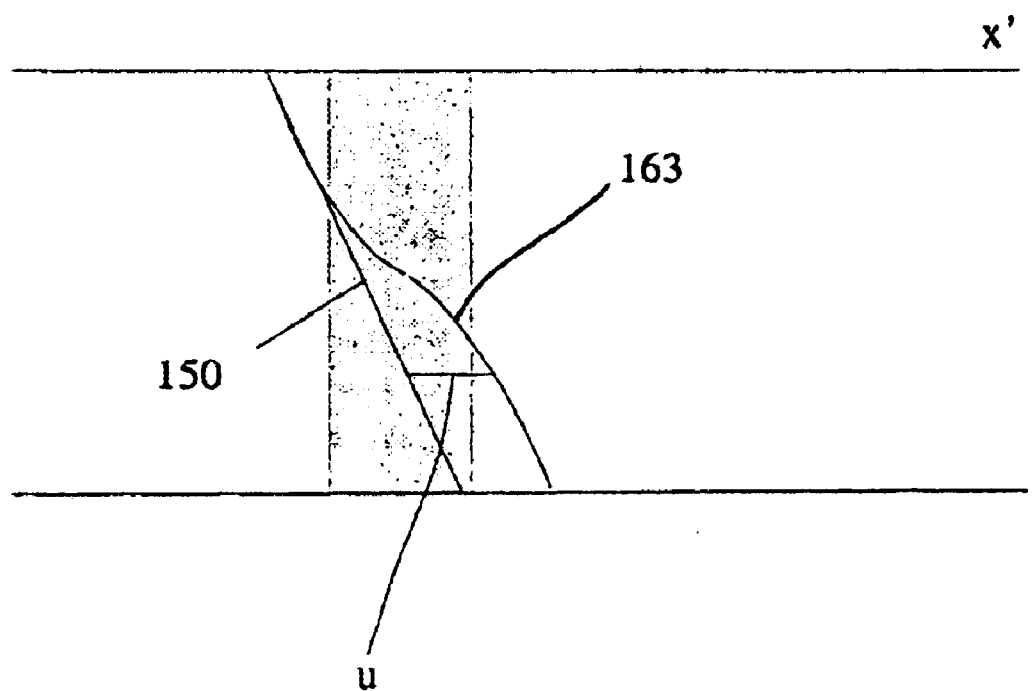
FIG. 7 is diagram showing a displacement distribution according to an embodiment of the invention.

Referring to FIG. 7, the displacement u(x') associated with any point x' along the deformed angled line 154 is calculated by comparing the undeformed line 150 and the transformed deformed line 163, i.e., the deformed line 162 after transformation in the x' coordinate. The strain $\epsilon(x')$ is calculated as a derivative of the displacement u(x') according to well known methods. See for example "Mechanics of Sheet Metal Forming", by Z. Marciniak, J. L. Duncan, and S. J. Hu ($2^{nd}$ Edition, Butterworth-Heinemann, 2002, page 3). Finally, the calculated strain is transformed to the deformed specimen coordinate x' for display as shown in FIG. 9c. It will be appreciated that because the displacement u can be continuously measured along any point of the deformed angled line 154 as described above, the displacement is not limited to measurements at predetermined discrete points. Therefore, the strain is also continuously measurable, rather than averaged within area units, as is the case in discrete grid methods.

Figure 8A:
FIG. 8a is an unprocessed top view image of a marked line after deformation.
Figure 8B:
FIG. 8b is the image of FIG. 8a after patching.
Figure 8C:
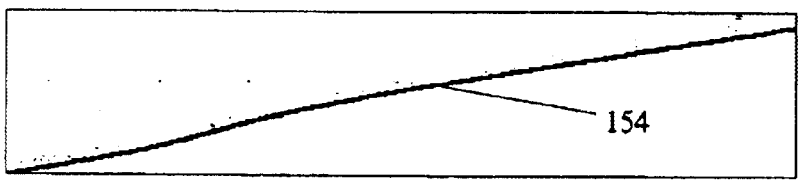
FIG. 8c is the image of FIG. 8b after edge detection.
Figure 9A:
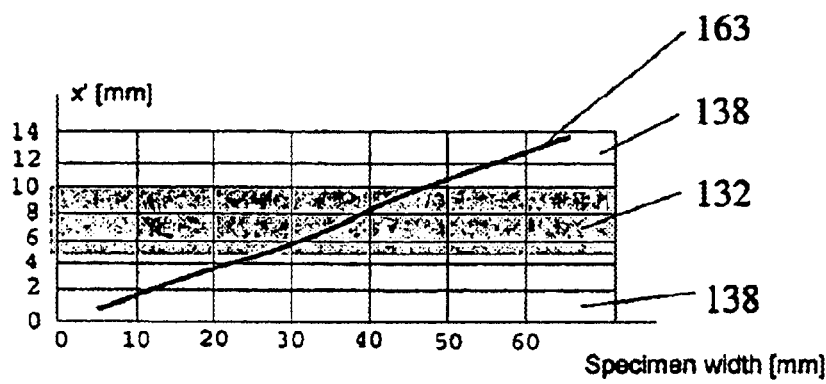
FIG. 9a is a graph of a marked line after deformation according to an embodiment of the invention.
Figure 9B:
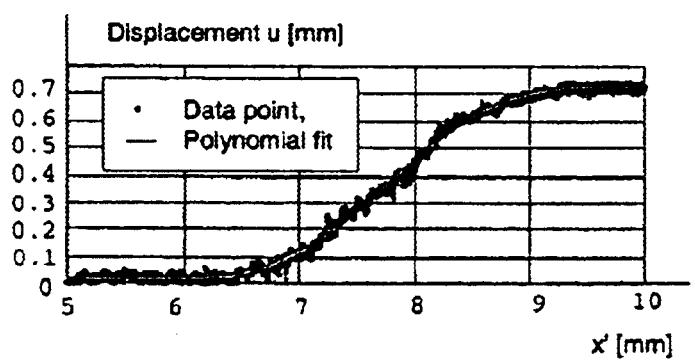
Figure 9C:
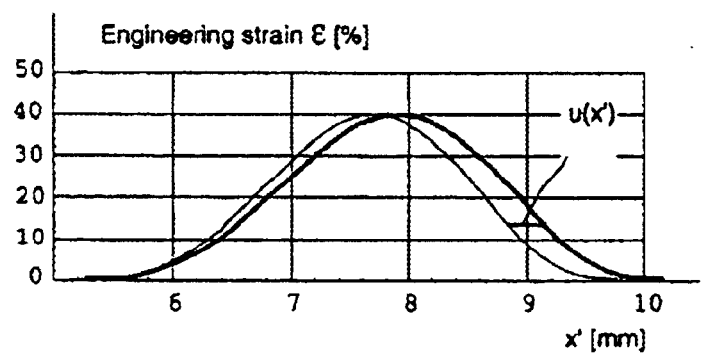
FIG. 9c is the engineering strain associated with the displacement of FIG. 9b.
Figure 10:
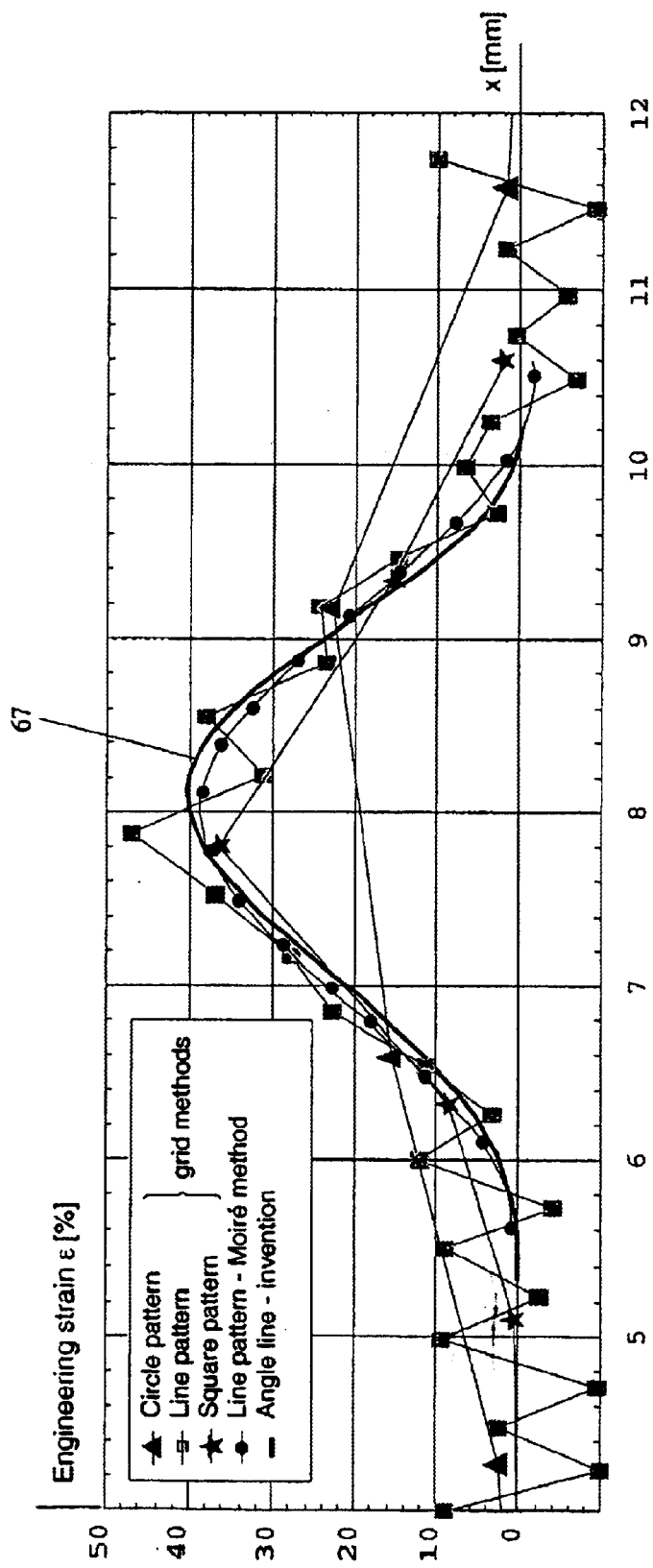
FIG. 10 is a graph comparing the strain of FIG. 9a with strains obtained using grid and moiré methods.

FIGS. 8–10 illustrate the present invention for an exemplary measurement of the distribution of strain on sheets 130 of aluminum alloy 6111-T4 subjected to 90° bending, such as flanging, for example. The sheet 130 is a coupon, which, in this example, has thickness t=0.92 mm, width w=100 mm, and length S=75 mm, as shown in FIGS. 2a and 3a. The width D of the angled marking 149 is 2 mm and the span 2L=14 mm. The magnification of the CCD camera 116 is selected such that in this experiment the width D of the marking 149 is about 10 pixels. FIG. 8a is a top view of the entire deformation area of the coupon 130. The image consists of 640×480 pixels and 8 bits per pixel, 256 gray levels ranging from pure black to pure white. FIG. 8b shows the result of the binary conversion and correction. FIG. 8c shows the results of edge detection, which determines the line 154 as a result of separate dark and bright regions of the deformed bent line. Line 154 is reduced to a width of one pixel. Edge detection is performed with a commercially available algorithm, such as Inspector 2.1 by Matrox, Inc.

FIG. 9a shows the deformed line 163 after the geometric 3D to 2D conversion, with the deformed 132 and undeformed regions 138 delineated in the same Figure. FIG. 9b shows the displacement distribution u derived from the deformed line 163. The displacement distribution is shown as in terms of data points and also as a polynomial fit obtained by methods well-known in the art, as described, for example, in "Mathematica handbook", by S. Wolfram ($4^{th}$ Edition, Mathematica v. 4.2 WolframResearch Inc., Chap. 3.8.1). FIG. 9c presents the engineering strain $\epsilon$ on the surface of the deformed coupon (sheet) 137.

Figure 11A:
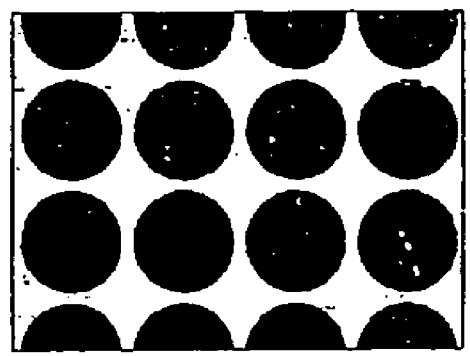
FIG. 11a is a circle pattern grid.
Figure 11B:
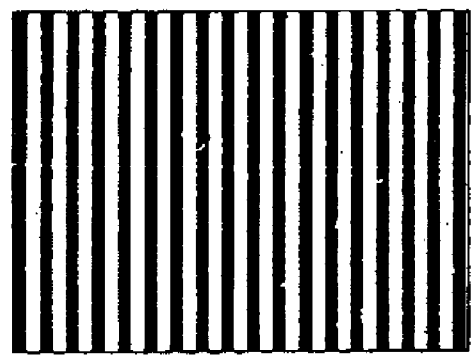
FIG. 11b is a line pattern for grid and moiré methods.

FIG. 10 shows a direct comparison of the bending strain distribution $\epsilon$ obtained according to the invention and according to several versions of the grid and moiré methods, in nominally identical coupons subjected to identical 90° bending (flanging). Specifically, the strain distribution $\epsilon$ obtained by the present invention is compared to grid methods that utilize a circle pattern shown in FIG. 11a, a line pattern shown in FIG. 11b, and a square pattern shown in FIG. 11c. The strain distribution obtained by the present invention is also compared with the strain distribution obtained by a moiré method utilizing the line pattern of FIG. 11b. The comparison shows that the distributions measured with the present invention and the moiré method are more accurate to those obtained with grid methods. Although the moiré method can be very accurate, its accuracy is sensitive to the orientation of the light sources in the experimental set-up, which affect the thickness of the lines in the fringe pattern shown in FIG. 11b. In contrast, the present method is relatively insensitive to even fairly large variations in the light source characteristics.

Figure 11C:
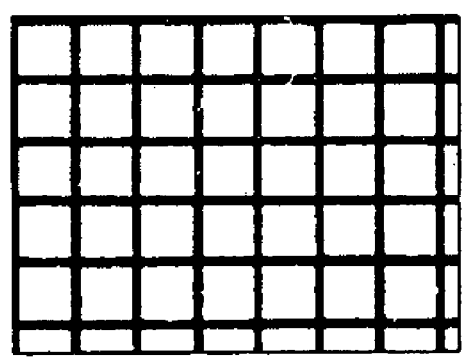
FIG. 11c is a square pattern grid.

In general, the strain resolution with the grid methods is quite poor. The resolution strongly depends on the size of the individual grid elements; the smaller the grid size, the greater the resolution and accuracy. In the experiment described, the dimensions for each square of FIG. 11c are 1×1 mm². Each circle of FIG. 11 has a 2 mm diameter. The line grid of FIG. 11b, has spacing 0.25 mm and line thickness 0.25 mm, which are near the practical limit in terms of resolution achievable with current imprint technology.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of measuring a surface strain of a band in a material sheet, the band having a width, the method comprising:

marking a single line traversing the width of the band at an angle before deformation;

deforming the band;

obtaining an equivalent two-dimensional image of the line after deformation by a method comprising:
  obtaining plan view and profile view images of the line after deformation; and
  performing a three-dimensional to two-dimensional transformation using the plan view and profile view images of the line after deformation;

comparing the line before deformation with the two-dimensional equivalent image of the line after deformation; and determining the strain in the band after deformation.

2. The method of claim 1, further comprising detecting an edge of each of the plan view and profile view images.

3. The method of claim 2, further comprising determining a displacement along the line after deformation.

4. The method of claim 1, wherein deformation includes large-angle bending.

5. The method of claim 1, wherein deformation includes hemming.

6. The method of claim 1, wherein deformation includes flanging.

7. The method of claim 1, wherein marking a single line includes marking a single area having a boundary line.

8. A method of measuring a surface strain of a material sheet; the method comprising:

marking a single straight line traversing a width of a planar band of the sheet an angle;

deforming the sheet such that the planar band becomes a bent band and the straight line becomes a three-dimensional curve;

taking a plan image of the three-dimensional curve on the bent band;

taking a profile image of the bent band;

processing the plan and profile images of the bent band to obtain a two-dimensional curve;

comparing the straight line to the two-dimensional curve; and determining the strain of the bent band along the two-dimensional curve.

9. The method of claim 8, wherein processing includes detecting an edge of the curve in the plan view and an edge of the bent band in the profile view.

10. The method of claim 9, wherein determining the strain includes obtaining a continuous description of the strain on the bent band.

11. The method of claim 8, wherein the straight band has first and second boundaries and the straight line extends beyond the first and second boundaries.

12. The method of claim 8, further comprising determining a displacement of the bent band the two-dimensional curve.

13. An optical system for measuring a surface strain of a band in a sheet of material after deformation, the system comprising:

a vision system configured to take a plan view image and a profile image of a line traversing a width of the band after deformation, wherein the line is marked on the band before deformation, an image acquisition system in operable communication with the vision system, the image acquisition system including edge detection software; and a computer system in operable communication with the image acquisition system, wherein the computer system includes a digital processing software and a strain calculation software that determine a two-dimensional transformation of the line after deformation, compare the line before deformation to the two-dimensional transformation of the line after deformation, and determine the strain of the bent band.

14. The optical system of claim 13, wherein the vision system includes at least one camera.

* * * * *

UNITED STATES PATENT AND TRADEMARK OFFICE
CERTIFICATE OF CORRECTION

| | | |
|---|---|---|
| PATENT NO. | : 7,036,364 B2 | Page 1 of 1 |
| APPLICATION NO. | : 10/670969 | |
| DATED | : May 2, 2006 | |
| INVENTOR(S) | : Slawomir J. Swillo, Kaushik Arjunan Iyer and Shixin Jack Hu | |

It is certified that error appears in the above-identified patent and that said Letters Patent is hereby corrected as shown below:

Column 3, line 5, after "is" insert --a--.

Column 4, line 56, after "image" insert --of--.

Column 7, claim 8, line 6, after "sheet" insert --at--.

Column 8, claim 12, line 2, after "displacement of" delete "the bent band".

Signed and Sealed this

Twenty-sixth Day of June, 2007

JON W. DUDAS
*Director of the United States Patent and Trademark Office*